United States Patent [19]

Fresh

[11] Patent Number: 4,724,575
[45] Date of Patent: Feb. 16, 1988

[54] THREE WHEEL MOUNTING ASSEMBLY HAVING A TAPERED INSERTION MEMBER

[76] Inventor: J. Douglas Fresh, 1115 Old Coachman Rd., Clearwater, Fla. 33575

[21] Appl. No.: 863,342

[22] Filed: May 15, 1986

[51] Int. Cl.$^4$ .............................................. E05D 15/06
[52] U.S. Cl. ......................................... 16/102; 16/97; 16/106; 160/207; 403/263
[58] Field of Search ........................................ 16/37–39, 16/87.4 R, 87, 89, 97, 98, 100, 102, 106, DIG. 1; 49/197, 425; 160/207; 403/253, 255, 263

[56] References Cited

U.S. PATENT DOCUMENTS

| | | | |
|---|---|---|---|
| 359,888 | 3/1887 | Pluekharp | 16/37 X |
| 713,839 | 11/1902 | Baynes | 16/37 X |
| 876,195 | 1/1908 | Kittleson | 16/106 |
| 1,009,221 | 11/1911 | Butler | 16/106 |
| 1,073,509 | 9/1913 | Nelson | 16/106 |
| 2,523,302 | 9/1950 | Hunt | 16/97 X |
| 2,871,932 | 2/1959 | Stroup | 16/97 X |
| 2,886,102 | 5/1959 | Olsen et al. | 16/97 X |

Primary Examiner—Fred Silverberg
Attorney, Agent, or Firm—Miller, Stanley M.

[57] ABSTRACT

A slideably and rotatably mounted roller member performs a precision take up reel function in the environment of a track mounted, drawable, pleated window covering. The roller member slides along an axis coincident with its axis of rotation as it rotates so that cord being wound therearound attendant its rotation is taken up in the absence of overlapping. One end of the roller member is provided with a centrally bored and threaded plug that screw threadedly engages a fixed position screw member; as the roller member rotates, the engagement of the screw member and the bore drives the plug and hence the roller member in an axial direction. The slideable mount of the roller member is provided in the form of a base member which is slideably received within the roller member housing. A novel "F"-shaped track member is engaged by wheel members positioned in a novel wheel housing, and laterally opposed wheel housings are interconnnected by a rigid interconnecting member that conforms to the shape of the pleats formed in the window covering. The assembly ensures that the window covering remains level at all of its functional positions.

3 Claims, 13 Drawing Figures

THREE WHEEL MOUNTING ASSEMBLY HAVING A TAPERED INSERTION MEMBER

BACKGROUND OF THE INVENTION

1. Field of the Invention

This invention relates to pleated window coverings in general, and more specifically relates to a novel take up reel means that ensures that laterally opposed ends of a window covering remain in a horizontal plane when the covering is being raised of lowered.

2. Description of the Prior Art

Modern home construction techniques use substantial amounts of glass since home buyers like to have substantially unrestricted views of their home settings.

Greenhouses or solarium structures and are becoming increasing popular in particular; they often include glass panes positioned in horizontal, vertical, and sloped planes.

Skylights are also in great demand since they provide free lighting.

The major drawback of these glass using structures is that they suffer from the drawbacks of "the Greenhouse Effect."

The wavelength of light changes as it passes through glass; heat reflected from a surface inside a solarium, for example, cannot escape as readily as it entered because the wavelength of infrared radiation (heat) is shorter than that of visible light. Thus, the inside of a solarium is a heat trap because once the wavelength of the light has been shortened, it cannot so easily pass through the glass again.

The most popular solution to the problem has been the use of window shades in general.

The most practical type of window shade is believed to be the pleated variety; these shades reflect incoming light to substantially offset the Greenhouse Effect but they do not spoil the view because they can be drawn up whenever desired.

Moreover they can be provided in translucent or transparent form as well to enhance the view even when they are in their lowered position.

Pleated window coverings are easier to clean than the outdated venetian blinds and their modern day counterparts which have narrower slats. More importatnly, perhaps, pleated window coverings, since their accordion-like structure is a continuous, integrally formed structure, they do a better job of reflecting light vis a vis discrete slat blinds.

Unfortunately, pleated window coverings of the prior art suffer from one of the more aggravating drawbacks that afflict the discrete slat blinds; they have a tendency for their base to skew from the horizontal when raised or lowered.

This skewing is caused by uneven take up of the cord used to draw the blinds or coverings. Specifically, a take up reel in the form of a roller member is positioned at the top of the pleated window covering. One or more cords extending the length of the window covering having their top ends secured to the roller member so that as it rotates in response to drawing or lowering of the covering, the cord or cords wrap around the roller member.

The uneven raising or lowering is attributed to the different overlapping patterns that affect the laterally spaced coils, i.e., a coil on the left hand side of the roller member may experience substantial overlap with the result that a single rotation of the roller member can take up a large amount of cord due to the larger effective diameter of the roller member caused by the winding of the cord upon itself whereas the cord being wound at the other end of the roller member might experience less overlapping. Since the coiling is allowed to occur without any control means, the amount of overlapping is entirely random and a tilt of the base of the window covering as a result of different amounts of overlapping almost always occurs.

There is a need for a window covering assembly that can be raised or lowered in the substantial absence of skewing.

Another drawback of heretofore known pleated window coverings is that their track assemblies are deficient in several respects. For example, solarium structures and the like often have vertical glass sections that meet sloped glass sections; to cover such structures, a gentle curve must be formed in the track which mounts the window covering. Unfortunately, the tracks that have been developed are heavy and require special bending tools to adapt them to particular settings.

Moreover, since wheel members are generally used to rollingly engage the tracks, the art has developed means for interconnecting laterally spaced sets of track-engaging wheel members. Again, the means developed by the art have been inadequate; specifically, cloth mateials are generally employed to interconnect the laterally spaced wheels, with unfortunate results.

There is therefore a need for an improved, easily bendable track and a need for an improved means for interconnecting laterally spaced track-engaging wheel members.

SUMMARY OF THE INVENTION

The inventive assembly overcomes the shortcomings of the prior art by providing a novel track, a novel wheel member housing, a novel wheel member housing interconnecting means, and perhaps most importantly of all, a novel roller member that prevents cord overlapping during the take up process so that skewing is eliminated.

The novel track has the general appearance of the letter "F" when seen in plan view; the vertical portion of the "F" is the base portion of the track in that the wheel members of the novel assembly rollingly engage that portion. More specifically, the portion ofthe "F" positioned intermediate the truncate, horizontally extending arms thereof is the portion of the track means base upon which the wheels actually roll. Thus, said arms provide a guide means for the wheels.

Due to the thin structure of the track, it can be bent on site so that installation of the window covering is easily accomplished.

In the preferred embodiment of the invention, a pair of vertically spaced wheel members rollingly engagement the guide portion of the track means, i.e., the base portion of the track means intermediate the parallel arms of the "F"-shaped merrbe.;, on the "back" side of the track (the side of the track facing the mullion), and one wheel member rollingly engages the "front" side of the track. The "front" wheel is masked from view by a portion of the wheel member housing that covers it.

The wheel member housing thus mounts three (3) wheel members. They are positioned at the corners of an imaginary equilateral triangle.

Laterally opposed wheel member housings are interconnected by an elongate, horizontally disposed, rigid interconnecting means. The interconnecting means is a hollow, triangular in transverse section extruded piece of aluminum; each wheel member housing has a complementally formed triangular insertion member projecting laterally therefrom that is adapted to press fittingly engage the interconnecting member when inserted into the hollow interior thereof. Each side wall of the interconnecting member has the dimension of an individual slat in the window covering.

The triangular shape of the rigid interconnecting member ensures that it will conform to the shape of the window covering as it is drawn, i.e., the pleated, integrally formed slats of the covering will overlie the flat side walls of the triangular interconnecting member and the presence of the interconnecting member will thereby be effectively concealed. A plurality of the interconnecting means are provided at vertically spaced intervals along the extent of the window covering as design applications require.

The novel roller member of the inventive assembly has a standard driving means positioned at one of its ends. The driving means itself is housed in a non-rotating housing, and said non-rotating housing is fixedly secured to a slideably mounted base means.

The base means has a disc-shaped appearance and is slideably mounted in a cylindrical housing; both the base means and the housing are formed of a suitable low friction material to allow the base to slide relative to the fixed position housing with little resistance.

The opposite end of the roller member is plugged with a centrally bored plug member. A fixed position, elongate screw member having a preselected number of threads per inch formed therein is mounted by a suitable bracket assembly so that the longitudinal axis of symmetry of the screw member is coincident with the axis of rotation of the roller member.

The bore in the plug is threaded so that when the roller rotates responsive to activation of its driving means, the screw threaded engagement of the screw member and said bore effects axial travel of the slideably mounted roller member.

Since the roller member undergoes axial displacement as it rotates, each winding of cord about its periphery is presented with an empty, unoccupied space and no cord is wound upon itself. Thus, the effective diameter of the roller is not increased by overlapping cord, and both cords on the roller member, affixed thereto at opposite ends thereof, will coil up at the same rate and the window covering will not skew.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

DETAILED DESCRIPTION OF THE PREFERRED EMBODIMENT

Figure 1:
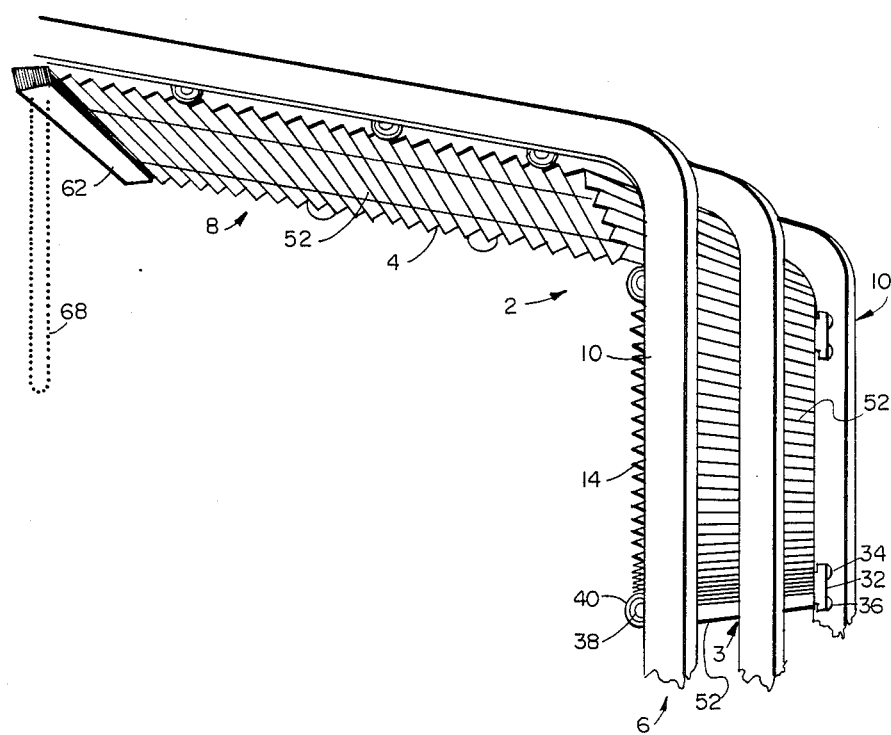
FIG. 1 is a perspective view of the novel structure, taken from the rear side thereof so that the rear wheels of the novel wheel assembly can be seen and so that the novel rigid interconnecting members can be seen as well.

Referring now to FIG. 1, it will there be seen that a window covering that incorporates all of the teachings of this invention is designated by the reference numeral 2 as a whole.

It should be understood from the outset that several features of the inventive structure 2 represent advances in the art, and that any one of them or any combination of them could be incorporated into window coverings of the prior art.

For example, as will become clear as this description proceeds, the novel roller ember and its precision winding means could be incorporated into an otherwise "old" window covering, i.e., it could be incorporated into a window covering lacking the other novel means disclosed hereinafter.

As a further example, the interconnecting members of this invention, described hereinafter in detail, could be incorporated into "old" window coverings to dramatically improve them, even if the other features of the inventive assembly were not adopted; moreover, the same is true of the novel track member disclosed hereinafter, the novel wheel housing, and other inventive elements of this invention.

FIG. 1 shows that the window covering selected as the preferred environment for the new parts disclosed hereinafter is of the pleated type; the pleats have an accordion-like structure and are denoted 4.

The particular window covering illustrated in FIG. 1 has a vertical section 6 and a sloped, generally horizontal section 8; one of the important teachings of this invention relates to a novel track construction that allows a gentle bend to be formed in the structure as depicted in FIG. 1 in the absence of heavy duty bending tools.

Figure 2:
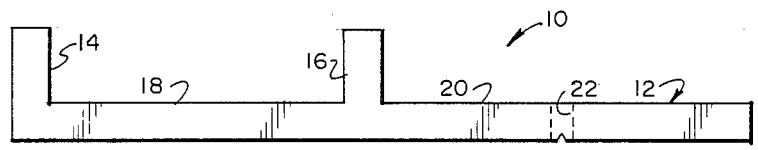
FIG. 2 is a plan view of the novel track.

Referring now to FIG. 2, it will there be seen that the novel track member 10 has the appearance of the letter "F" when seen in end view; the relatively thin construction of track 10 enables it to be bent on site instead of at the installer's place of business. Accordingly, the construction of track 10 eliminates the need to pre-measure the curvatures of the glass areas to be covered and allows the installer to bend the tracks on site.

Track 10 includes base 12 and parallel arms 14, 16 normal thereto.

The portion of base 12 intermediate arms 14, 16 is the portion upon which the wheel members of the novel assembly roll when the invention assembly is in use and will hereinafter be referred to as the guide portion 18.

Figure 3:
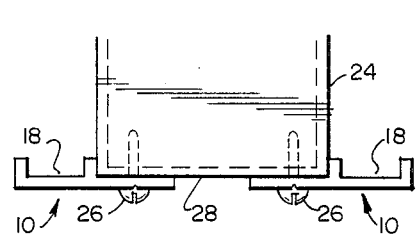
FIG. 3 is a plan view depicting the track mounted directly on a mullion.

The portion of base 12 lying outwardly of arms 14, 16 is denoted 20; a screw-receiving bore 22 is formed in outlying portion 20 and the utility of such bore 22 is shown in FIG. 3 to which FIG. attention is now directed.

A window formed by a plurality of glass sections will have a plurality of horizontally disposed trunions and vertically disposed mullions separating the individual glass panes. A mullion 24 is shown in FIGS. 3 and 4 in vertical section; in each of FIGS. 3 and 4, mullion 24 separates two windows, each of which is provided with the novel window covering assembly of the present invention.

Figure 4:
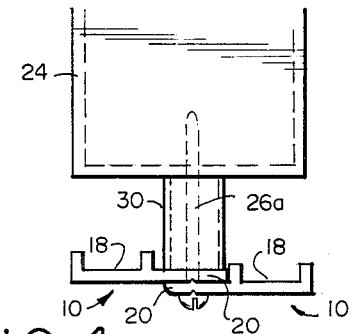
FIG. 4 is a plan view depicting the track mounted in spaced relation to a mullion, showing how a pair of track members can be overlapped to narrow the spacing between laterally adjacent wheel members.

The track mounting shown in FIGS. 3 and 4 is shown to illustrate the versatility of track member 10; FIG. 3 shows it mounted directly on a mullion, and FIG. 4 shows a spaced mounting.

Referring specifically to FIG. 3, it will there be seen that a screw member 26 extends through bore 22 shown in FIG. 2 and serves to fixedly and abuttingly secure track 10 to mullion 24. When so mounted, guide portions 18 of the respective tracks 10 are laterally spaced from their respective mullions and are accordingly capable of receivng the wheel members of the inventive assembly.

The mounting of FIG. 3 will leave visible the midportion 28 of mullion 24. Where it is desired to cover the mullion, the track mounting arrangement of FIG. 4 may be employed.

In FIG. 4, outlying portions 20 of track 10 are positioned so that one of said portions overlies the other as depicted; this aligns bores 22. Spacer 30 is then positioed between mullion 24 and the innermost track 10 and an elongate screw 26a is positioned through the aligned bores 22 and screwed into the mullion as depicted. This mounting covers mullion 24 from view; the space between guide portions 18 of the tracks 10 and the surface of mullion 24 accommodates the wheel members of the novel assembly.

Figure 5:
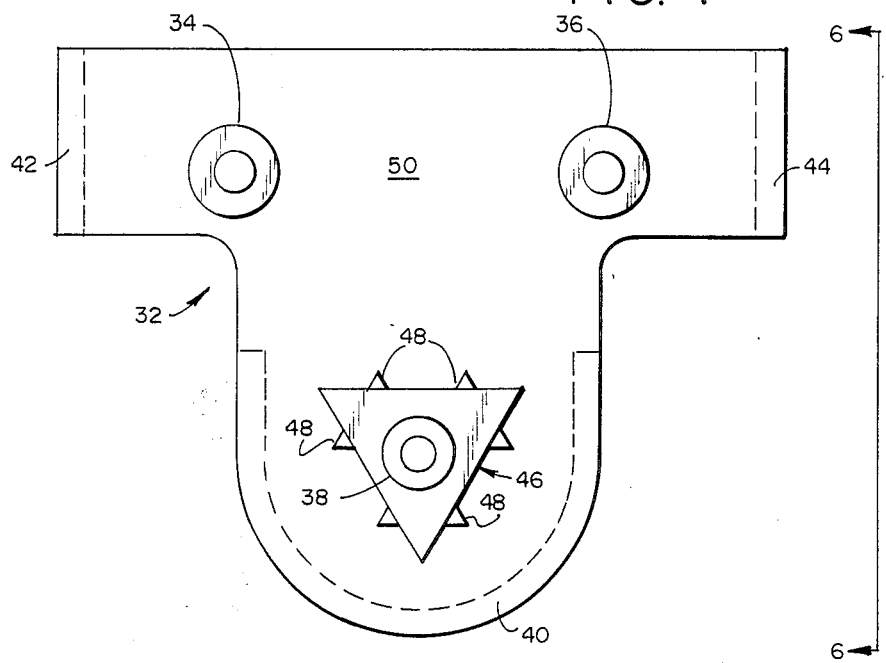
FIG. 5 is a side elevational view of the novel wheel housing.

Referring now to FIG. 5, it will there be seen that the wheel housing is denoted 32 as a whole.

Housing 32 houses three rotatably mounted wheel members 34, 36, 38, all of which are shown in phantom lines because they are positioned on the "hidden" side of such housing 32 in the view of FIG. 5. (Actually, only the hubs of the wheels are depicted in FIGS. 5 and 6 to simplify the drawings).

Wheel members 34, 36 are positioned in a vertical plane when operatively deployed, and rollingly engage portion 18 of track 10. Wheel member 38 is positioned on the visible side of track 10, however, and is preferably hidden from view by opaque cover 40, shown in FIGS. 1, 5, 6 and 7.

Cover 40 is integrally formed with housing 32; housing 32 also includes a pair of outwardly turned covers 42, 44 for wheel members 34, 36, respectively. The term "outwardly" is used because the direction "inwardly" will hereinafter be used to indicate the direction toward the center of a window covering, i.e., the term "outwardly" refers to the direction away from the center of the covering, or to the direction of the next adjacent covering on the opposite side of a mullion.

Figure 6:
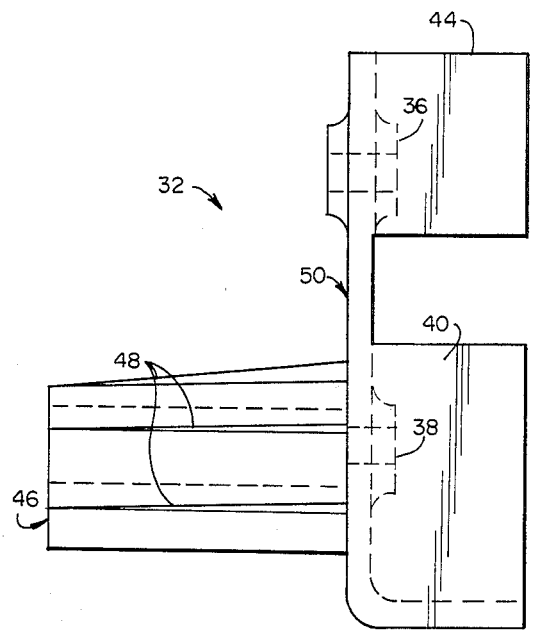
FIG. 6 is an elevational view taken along line 6—6 of FIG. 5.
Figure 7:
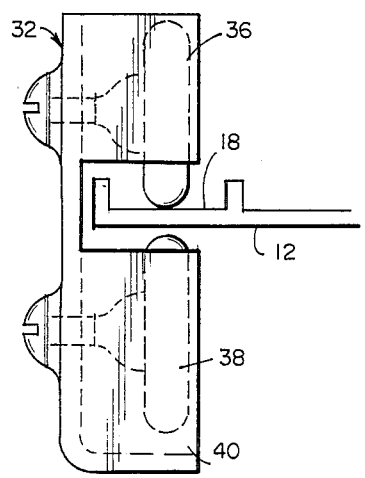
FIG. 7 is an elevational view showing how the wheel members positioned within the wheel member housing rollingly engage the track member. The insertion member that is integrally formed with the wheel member housing has been eliminated from this FIG. to simplify it.

In keeping with the aforementioned terminology, then, FIG. 6 should be understood as depicting wheel member housing 32 positioned so that wheel coverings 40, 42 and 44 are extending outwardly, and the member 46 is extending inwardly.

As best shown in FIG. 5, member 46 is triangular in configuration; it is so shaped because it fits in the triangular shaped hollow interior of the rigid interconnecting member that interconnects laterally spaced wheel member housings as best shown in FIG. 1 and as will become more clear as this description proceeds.

A pair of small, triangular in configuration ridges, collectively designated 48, are integrally formed on each flat wall of member 46 as best shown in FIG. 5; each ridge 48 gradually diminishes in height as it extends from base wall 50 of member 46 as shown FIG. 6. (Member 46 projects inwardly from base wall 50 whereas cover members 40, 42, 44 project outwardly therefrom; thus, the height of ridges 48 diminishes as they extend inwardly).

Figure 8:
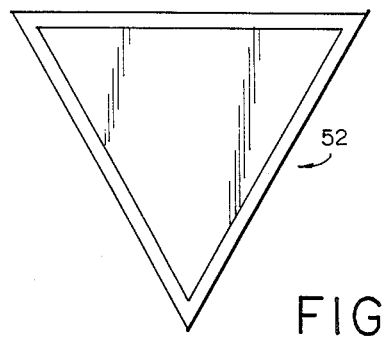
FIG. 8 is an end view of the novel interconnecting member.
Figure 9:
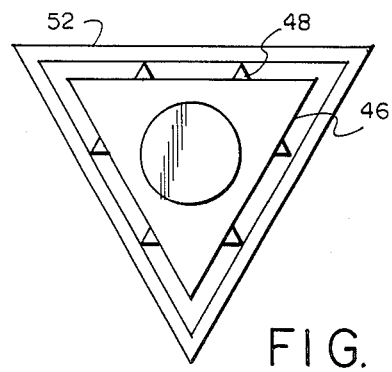
FIG. 9 is an end view showing the triangular portion of the wheel member housing snugly positioned within the hollow interior of the interconnecting member.

The purpose of member 46 and ridges 48 is made clear in FIG. 8; member 46 will hereinafter be referred to as insertion member 46 because it is inserted into the hollow interior of the elongate, rigid interconnecting member 52 the end of which appears in FIGS. 8 and 9. Member 52 is preferably formed of aluminum and extruded; its inner dimension is slightly larger than the outer dimension of insertion member 46 so that the latter may be inserted thereinto. Ridges 48 provide a wedging action as insertion member 46 is inserted into the triangular hollow cavity of interconnecting member 52. Due to the narrow line of contact formed by each triangular ridge 48, the friction resistance to insertion of the insertion member 46 into the cavity of member 52 is minimized while the wedging action nevertheless insures against inadvertant separation of the wedged-together members.

Thus, a wheel member housing 32 on a first side of a window covering associated with a first track is rigidly interconnected with its horizontally aligned, laterally spaced counterpart on the opposite side of the same window covering by interconnecting member 52. Specifically, each wheel member housing 32 is positioned so that its insertion member 46 is inwardly directed and the members 46 are inserted into the opposite ends of interconnecting member 52. Due to the triangular shape of interconnecting member 52, it conforms to the shape of the individual slats or pleats 4 (FIG. 1) as they fold upon one another, accordion style, attendant drawing of the window covering. Interconnecting members 52 are of course positioned at intervals on the hidden or rear side of the covering as shown in FIG. 1.

Figure 10:
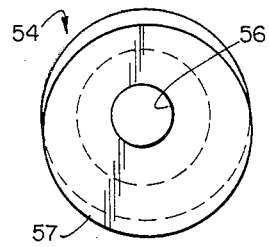
FIG. 10 is a side elevational view of a bore lining that prevents cord fraying.
Figure 10A:
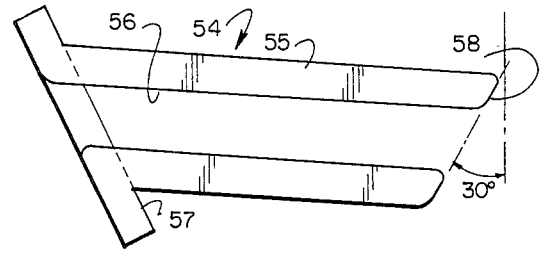
FIG. 10A is an end view of the bore lining member shown in FIG. 10.

To prevent cord fraying as it passes through the bores (not shown) formed in the insertion member 46 and interconnecting member 52, bore lining member 54 is provided (see FIGS. 10 and 10A).

Bore lining member 54 includes main body portion 55 that is bored as at 56 to slidingly receive a cord therethrough (not shown). An annular flange 57 is angled as shown to conform to the shape of the interconnecting member 52 as is the unflanged opposite end 58 of the liner 54.

Figure 12:
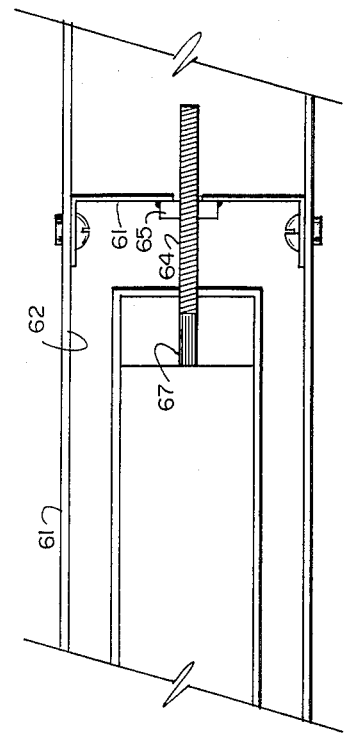
FIG. 12 is a side elevational view of the roller member similar to that of FIG. 11, but showing a motor-driven roller member instead of the chain driven roller member of FIG. 11.
Figure 12:
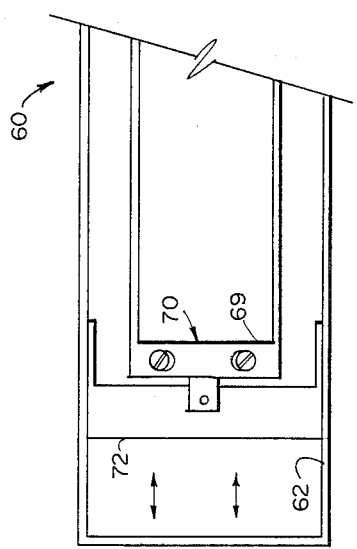
Figure 11:
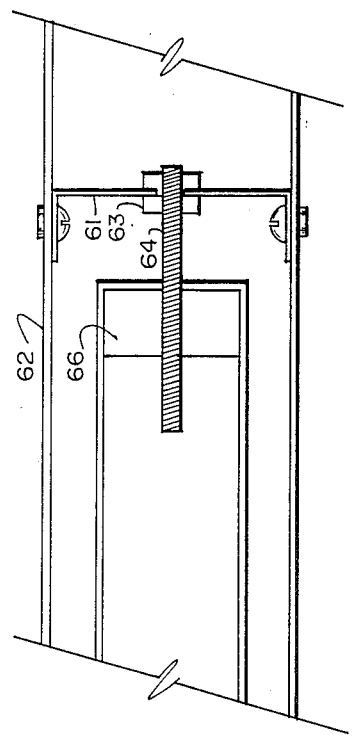
FIG. 11 is a side elevational view of the novel roller member and its associated mounting means.
Figure 11:
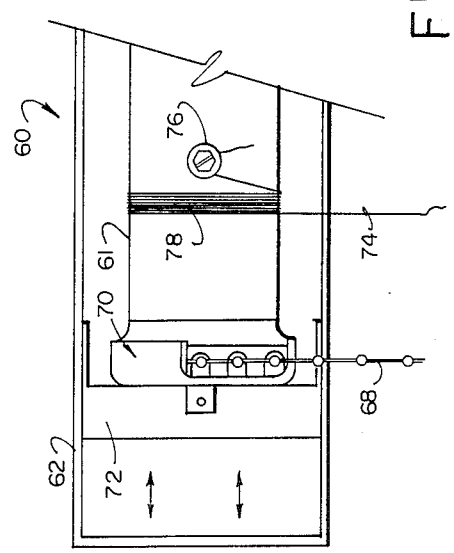

Referring now to FIGS. 11 and 12, it will there be seen that the slideably mounted roller member of the present invention is designated by the reference numeral 60 as a whole.

Numerous means for slideably mounting the same are of course available and the means shown in FIGS. 11 and 12 are merely illustrative.

Bracket 61 is secured by suitable means to roller housing 62 as shown, and is apertured to receive elongate screw member 64. Threaded lock nuts 63 (FIG. 11) or a permanent mounting means 65 (FIG. 12) may be employed as a part of the slideable mounting means.

In the embodiment of FIG. 11, screw 64 engages threads formed in plug 66 so that rotation of roller member 60 effects axial travel of said roller 60 because the position of screw 64 is fixed.

In the embodiment of FIG. 12, the distal free end 67 of screw 64 is not threaded but since roller 60 is slideably mounted and since screw member 64 is fixed position, the same rotation-responsive axial travel of roller 60 occurs; a compression fit effectively unites screw member 64 and plug 66 in this embodiment.

Referring now to the left side of FIGS. 11 and 12, it will there be seen that the means for effecting rotation of roller 60 in FIG. 11 is a manual bead chain 68 and the rotation means in FIG. 12 is an electric motor means 69.

In both embodiments, the means for effecting rotation of roller member 60 is housed in a non-rotatable housing designated 70. Housing 70 is fixedly secured to a base member 72 which is slideably mounted with respect to roller member housing 62. Base member 72 is preferably formed of nylon or other suitable low friction material so that the sliding movement of base 72 relative to housing 62 is relatively friction free.

A string or cord 74 has its lowermost end secured to the lowermost portion 3 of the window covering 2 (FIG. 1). The uppermost end of string 74 is fixedly secured to roller 60 as at 76 (FIG. 11).

As chain 68 is pulled or motor means 69 is activated, roller 60 rotates about its axis of rotation and slides along said axis under the driving influence of the screw member 64. In the embodiment shown in FIG. 11, roller member 60 is rotating in a direction that causes it to travel to the right as viewed in said FIG. Accordingly, string 74 winds about roller member 60 in the non-overlapping manner designated 78 because an open or unoccupied section of roller 60 will be presented to each length of string 74 as it undergoes coiling.

Another string, not shown, coils about the other end of roller 60. Only one string is shown in FIG. 11 to simplify the drawing and both strings are omitted from FIG. 12 for the same reason.

The means for slideably mounting roller 60 is thus seen to be simple yet effective. The elimination of string overlapping, the provision of the versatile "F"-shaped track member, the novel wheel housing and the rigid interconnecting member that aesthetically conforms to the pleats of the window covering, individually and collectively represent important advances in the art of window coverings.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A wheel mounting assembly including an interconnecting means having utility in the environment of a track mounted window covering of the type having wheels that rollingly engage laterally spaced tracks, comprising:
    a pair of laterally spaced sets of wheels;
    a wheel housing for each of said sets of wheels;
    said interconnecting means further including an elongate rigid and hollow interconnecting member having a triangular in configuration cross-section for interconnecting said laterally spaced wheel housings;
    an attachment means for securing the opposite ends of said interconnecting member to said wheel housings;
    said attachment means including a triangular in configuration insertion member formed on each of said wheel housings for press fit engagement with a hollow interior of said interconnecting member;
    and said attachment means further including a plurality of ridge members formed on each of said insertion members, the height of said ridge members collectively diminishing as said ridges extend toward the center of their associated said interconnecting member, thereby providing a wedging action that substantially prevents inadvertant separation of said respective insertion members and hence of said housing members from their press fit engagements with said interconnecting member.

2. The interconnecting means of claim 1, wherein said interconnecting member is extruded and formed of aluminum.

3. The assembly of claim 1, further comprising:
    said wheel housing comprising a base wall member;
    wherein said sets of wheels comprises three wheel members, said three wheel members being rotatably mounted upon said base wall member for rotation in a plane parallel to and spaced apart from said base wall member on a first or outer side thereof;
    said wheel members positioned at the respective corners of an imaginary triangle on said base wall member;
    and said insertion member mounted to said base wall member on a second or inner side thereof.

* * * * *